(12) United States Patent
Nito et al.

(10) Patent No.: US 11,692,303 B2
(45) Date of Patent: Jul. 4, 2023

(54) PRETREATMENT LIQUID, PRETREATED FABRIC AND METHOD FOR PRODUCING THE SAME, AND IMAGE FORMING METHOD

(71) Applicant: Konica Minolta, Inc., Tokyo (JP)

(72) Inventors: Ken Nito, Tokyo (JP); Takuya Okada, Aichi (JP); Masaki Nakamura, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 49 days.

(21) Appl. No.: 17/324,321

(22) Filed: May 19, 2021

(65) Prior Publication Data

US 2021/0363691 A1    Nov. 25, 2021

(30) Foreign Application Priority Data

May 22, 2020    (JP) .................................. 2020-090059

(51) Int. Cl.

| | |
|---|---|
| *D06M 15/507* | (2006.01) |
| *C09D 11/328* | (2014.01) |
| *C09D 11/324* | (2014.01) |
| *D06P 5/00* | (2006.01) |
| *D06P 5/30* | (2006.01) |
| *D06M 101/06* | (2006.01) |
| *D06M 101/32* | (2006.01) |
| *C09D 11/102* | (2014.01) |
| *C09D 11/322* | (2014.01) |
| *C09D 11/40* | (2014.01) |
| *B41J 2/21* | (2006.01) |
| *B41J 2/01* | (2006.01) |

(52) U.S. Cl.
CPC ............ *D06M 15/507* (2013.01); *B41J 2/01* (2013.01); *B41J 2/2114* (2013.01); *C09D 11/102* (2013.01); *C09D 11/322* (2013.01); *C09D 11/324* (2013.01); *C09D 11/328* (2013.01); *C09D 11/40* (2013.01); *D06P 5/001* (2013.01); *D06P 5/30* (2013.01); *D06M 2101/06* (2013.01); *D06M 2101/32* (2013.01); *D10B 2401/14* (2013.01)

(58) Field of Classification Search
CPC .. B41M 7/009; B41M 5/0023; B41M 5/0047; B41M 5/0011; B41M 5/0017; B41M 7/00; B41M 7/0072; B41M 5/52; B41M 5/5218; B41M 5/5227; B41J 2/2107; B41J 2/01; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; C09D 11/102; C09D 11/32; C09D 11/322; C09D 11/36; C09D 11/40; C09D 11/30; C09D 11/38; C09D 11/324; C09D 11/328; C09D 11/101; C09D 11/005; C09D 11/54; C09D 11/52; C09D 11/106; D06P 1/44; D06P 1/54; D06P 1/673; D06P 5/30

See application file for complete search history.

(56) References Cited

U.S. PATENT DOCUMENTS

| | | | | |
|---|---|---|---|---|
| 2007/0222811 | A1* | 9/2007 | Yanagi ................... | B41J 2/2114 347/98 |
| 2009/0268002 | A1* | 10/2009 | Houjou .................. | B41J 11/002 347/102 |
| 2010/0196604 | A1* | 8/2010 | Kariya .................. | C09D 11/322 427/256 |
| 2010/0227064 | A1* | 9/2010 | Yanagi ................. | C09D 11/322 524/502 |
| 2016/0090497 | A1* | 3/2016 | Ito .......................... | B41J 2/2107 347/100 |
| 2018/0171172 | A1* | 6/2018 | Yamano ............... | C09D 153/00 |
| 2021/0309878 | A1* | 10/2021 | Guo ...................... | C09D 11/322 |
| 2022/0033667 | A1* | 2/2022 | Yamada ............... | C09D 11/322 |

FOREIGN PATENT DOCUMENTS

| | | |
|---|---|---|
| JP | 2019-090149 A | 6/2019 |
| JP | 2019-090150 A | 6/2019 |

\* cited by examiner

*Primary Examiner* — Manish S Shah

(74) *Attorney, Agent, or Firm* — Lucas & Mercanti, LLP

(57) ABSTRACT

The pretreatment liquid of the present invention is applicable for a fabric to be used for inkjet textile printing, and the pretreatment liquid contains a block copolymer including a hydrophobic block derived from a hydrophobic resin having an SP value of less than 11 and a hydrophilic block derived from a hydrophilic resin having an SP value of 11 or more, with the difference between the SP values of the hydrophobic resin and the hydrophilic resin of 1.0 or more; and water.

16 Claims, No Drawings

PRETREATMENT LIQUID, PRETREATED FABRIC AND METHOD FOR PRODUCING THE SAME, AND IMAGE FORMING METHOD

CROSS REFERENCE TO RELATED APPLICATIONS

The entire disclosure of Japanese Patent Application No. 2020-090059, filed on May 22, 2020 is incorporated herein by reference in its entirety.

BACKGROUND

Technological Field

The present invention relates to a pretreatment liquid, a pretreated fabric and a method for producing the pretreated fabric, and an image forming method.

Description of Related Art

As a textile printing method, printing for forming an image on a fabric by an inkjet method, which is often referred to as inkjet textile printing, has been widely used because the time required for a dyeing process is short, the production efficiency is high, and the like.

The inkjet textile printing forms an image by ejecting minute droplets of an ink from an inkjet recording head to be landed on a fabric. The types of coloring materials contained in inks to be used in the inkjet textile printing include dyes and pigments.

As a dye ink used for inkjet textile printing, a dye ink in accordance with the type of a fabric is normally used. For example, disperse dye inks are used for fabrics containing polyester fibers, and reactive dye inks are used for fabrics containing cellulose fibers, such as cotton and rayon.

Fabrics used for inkjet textile printing may be treated with a pretreatment liquid from the viewpoint of enhancing the fixability of an ink (ink fixability) and reducing the bleeding of the ink. For example, as a pretreatment liquid for polyester fabrics, a pretreatment liquid containing polyester resin particles and a styrene-butadiene resin emulsion is known (see Patent literature Japanese Patent Application Laid-Open No. 2019-90150). As a pretreatment liquid for blended fabrics of polyester fibers and cotton, a pretreatment liquid containing polyester resin particles and an urethane resin emulsion is known (see Japanese Patent Application Laid-Open No. 2019-90149).

In recent years, there is a demand for a pretreatment liquid that can give high ink fixability regardless of the type of fabric. Specifically, there is a demand for a pretreatment liquid capable of giving high ink fixability for a blended fabric of fibers having different polarities or various fabrics having different polarities, obtaining excellent ink fixability and suitable washing fastness, and forming an image with reduced ink bleeding.

However, the pretreatment liquid of Japanese Patent Application Laid-Open No. 2019-90150 can give ink fixability for a fabric containing a hydrophobic fiber such as a polyester fiber, but cannot give ink fixability for a fabric containing a hydrophilic fiber such as cotton.

The pretreatment liquid of Japanese Patent Application Laid-Open No. 2019-90149 can give ink fixability for a blended fabric of a polyester fiber and cotton to some degree, but cannot obtain suitable washing fastness or form an image with reduced ink bleeding.

Recently, a pigment ink may be used in place of a dye ink in inkjet textile printing. Unlike dye inks, pigment inks do not dissolve in fibers of fabrics or react with the fibers, thus the ink fixability of pigment inks is likely to be less (than that of dye inks). There is thus a higher demand for a pretreatment liquid that can give high ink fixability.

The present invention has been made in the view of the above situations, and an object of the present invention is to provide a pretreatment liquid capable of giving high ink fixability for various fabrics having different polarities, obtaining suitable washing fastness, and forming an image with reduced ink bleeding; a pretreated fabric and a method for producing the pretreated fabric; and an image forming method.

SUMMARY

The present invention relates to a pretreatment liquid, a pretreated fabric and a method for producing the pretreated fabric, and an image forming method as follows.

A pretreatment liquid of the present invention is applicable for a fabric to be used for inkjet textile printing, and the pretreatment liquid contains a block copolymer including a hydrophobic block derived from a hydrophobic resin having an SP value of less than 11 and a hydrophilic block derived from a hydrophilic resin having an SP value of 11 or more, the difference between the SP values of the hydrophobic resin and the hydrophilic resin being 1.0 or more; and also containing water.

A pretreated fabric of the present invention is a fabric to be subjected to an application of an inkjet textile printing ink, the pretreated fabric being obtained by pretreating at least a part of a surface of a fabric, and the pretreated fabric contains a block copolymer including a hydrophobic block derived from a hydrophobic resin having an SP value of less than 11 and a hydrophilic block derived from a hydrophilic resin having an SP value of 11 or more, the difference between the SP values of the hydrophobic resin and the hydrophilic resin being 1.0 or more.

A method for producing the pretreated fabric of the present invention includes applying the pretreatment liquid of the present invention to at least a part of the surface of a fabric to obtain the pretreated fabric.

An image forming method of the present invention includes 1) preparing a pretreated fabric that contains a block copolymer including a hydrophobic block derived from a hydrophobic resin having an SP value of less than 11 and a hydrophilic block derived from a hydrophilic resin having an SP value of 11 or more, a difference between the SP values of the hydrophobic resin and the hydrophilic resin being 1.0 or more, at least a part of a surface of the pretreated fabric being pretreated; and 2) applying an ink containing a coloring material to the surface of the pretreated fabric by an inkjet method.

DETAILED DESCRIPTION OF EMBODIMENTS

Hereinafter, one or more embodiments of the present invention will be described with reference to the drawings. However, the scope of the invention is not limited to the disclosed embodiments.

As described above, a pretreatment liquid containing a hydrophilic binder resin and a hydrophobic binder resin as described in Japanese Patent Application Laid-Open No. 2019-90149 cannot give sufficient ink fixability for fabrics having different polarities, suitable washing fastness or a sufficient ink bleeding reduction effect.

The present inventors have found that a pretreatment liquid containing a block copolymer including a hydrophobic block derived from a hydrophobic resin, such as polyester, having an SP value of less than 11 and a hydrophilic block derived from a hydrophilic resin having an SP value of 11 or more can give suitable washing fastness and a bleeding reduction effect regardless of the polarity of a fabric.

The reason for this is not clear, but it is presumed as follows.

When a pretreatment liquid containing a hydrophilic binder resin and a hydrophobic binder resin as described in Japanese Patent Application Laid-Open No. 2019-90149 is applied to a fabric containing hydrophilic fibers, the hydrophilic binder resin is bound to the fabric while the hydrophobic binder resin is not bound to the fabric. When friction is applied to the surface of an image-formed product (product on which an image is formed) obtained by using such a fabric, the hydrophobic binder resin, which is not bound to the fabric, is more likely to be peeled off from the fabric together with an ink component, and the washing fastness and the bleeding reduction effect are less likely to be obtained.

When the pretreatment liquid of the present invention including a block copolymer including hydrophobic blocks and hydrophilic blocks is applied to a fabric containing hydrophilic fibers, the hydrophilic block of the block copolymer is bound to the fabric and the hydrophobic block is bonded to the hydrophilic block, even if the hydrophobic block is not directly bound to the fabric. When friction is applied to the surface of an obtained image-formed product, the hydrophobic block is less likely to be peeled off from the fabric together with an ink component, and thus the washing fastness and the bleeding reduction effect are more likely to be obtained.

In addition, when the pretreatment liquid containing such a block copolymer is applied to a fabric containing a hydrophobic fiber such as a polyester fiber, the hydrophobic block of the block copolymer is more likely to be bound to the fabric, and the hydrophilic block is less likely to detach upon application of friction as the hydrophilic block is bonded to the hydrophobic block. Therefore, the pretreatment liquid of the present invention is capable of giving high ink fixability, suitable washing fastness, and a bleeding reduction effect for both fabrics containing hydrophilic fibers such as cotton and fabrics containing hydrophobic fibers such as polyester fibers. Hereinafter, the configuration of the present invention will be described.

1. Pretreatment Liquid

The pretreatment liquid contains a specific block copolymer and water.

1-1. Specific Block Copolymer

The specific block copolymer includes at least one hydrophobic block derived from a hydrophobic resin having an SP value of less than 11 and at least one hydrophilic block derived from a hydrophilic resin having an SP value of 11 or more. Difference $\Delta SP$ ($SP_B$-$SP_A$) between the SP value ($SP_B$) of the hydrophilic resin, which constitutes the hydrophilic block, and the SP value ($SP_A$) of the hydrophobic resin, which constitutes the hydrophobic block, is preferably 1.0 or more. A pretreatment liquid having the $\Delta SP$ of 1.0 or more is capable of giving high ink fixability and suitable washing fastness and a bleeding reduction effect for both fabrics containing hydrophilic fibers such as cotton and fabrics containing hydrophobic fibers such as polyester fibers. From the same viewpoint, the $\Delta SP$ is more preferably 2.0 or more.

The SP value is referred to as a solubility parameter. The SP value of a resin material in the present invention can be obtained from a molecular attractive force constant, that is, by a method in which the SP value is obtained by the equation SP value=$\Sigma G/V$ from molecular attractive force constant (G) and molar volume (V) of each functional group or atomic group constituting the resin molecule (D. A. Small, J. Appl. Chem., 3,71, (1953), K. L. Hoy, J. Paint Technol., 42, 76 (1970)).

When the specific block copolymer includes two or more types of hydrophobic blocks (for example, hydrophobic block 1 derived from hydrophobic resin 1 and hydrophobic block 2 derived from hydrophobic resin 2), the SP value of the hydrophobic blocks can be obtained based on the following equation.

$$SP \text{ value of hydrophobic blocks}=(SP1 \times c1)+(SP2 \times c2)$$

(SP1: SP value of hydrophobic resin 1
SP2: SP value of hydrophobic resin 2
c1: Content (mass ratio) of hydrophobic block 1
c2: Content (mass ratio) of hydrophobic block 2)

The SP value of the hydrophilic block can be specified in the same manner.

[Hydrophobic Block]

The hydrophobic block is derived from a hydrophobic resin having an SP value of less than 11.

The SP value of the hydrophobic resin having an SP value of less than 11 is less than 11 and preferably ±2 or less, more preferably ±1 or less, and even more preferably ±0.5 or less relative to the SP value of the hydrophobic fiber constituting a fabric to be used. When the hydrophobic fiber constituting the fabric is, for example, a polyester fiber having an SP value of 10.7, the SP value of the hydrophobic resin constituting the hydrophobic block is preferably 8.7 to 11, more preferably 9.5 to 11, and even more preferably 10.2 to 11.

Examples of the hydrophobic resin having an SP value of less than 11 include polyester (10.7), polytetrafluoroethylene (PTFE) (6.2), polyisobutylene (7.7), polyethylene (8.1), polyisoprene (8.15), polylauryl methacrylate (8.2), polystearyl methacrylate (8.2), poly(isovonyl methacrylate) (8.2), poly(t-butyl methacrylate) (8.2), polybutadiene (8.4), polystyrene (9.1), polyethyl methacrylate (9.1), polyethyl acrylate (9.2), polymethyl methacrylate (9.3), polymethyl acrylate (9.7), and polyvinyl chloride (10.1). In particular, polyester is preferred.

Polyester may be any polymer obtained by reacting a dicarboxylic acid with a diol. That is, the polyester contains a component unit derived from a dicarboxylic acid and a component unit derived from a diol.

(Components Unit Derived from Dicarboxylic Acid)

Any component unit derived from a dicarboxylic acid may be used, but from the viewpoint of enhancing the affinity with a fabric containing a polyester fiber, the component units preferably contain a component unit derived from an aromatic dicarboxylic acid.

Examples of the aromatic dicarboxylic acid include terephthalic acid, isophthalic acid, phthalic acid (orthophthalic acid), naphthalene-2,6-dicarboxylic acid, naphthalene-2,7-dicarboxylic acid, and anthracendicarboxylic acid. The aromatic dicarboxylic acid is preferably terephthalic acid.

These aromatic dicarboxylic acids may further have an anionic group (for example, carboxyl group and sulfonyl group). Examples of the aromatic dicarboxylic acid having an anionic group include trimellitic acid, sulfoterephthalic acid, sulfoisophthalic acid, and sulfophthalic acid.

The component units derived from the aromatic dicarboxylic acid may be 5 to 100 mol %, preferably 10 to 100 mol %, based on the total number of moles of the component units derived from the dicarboxylic acid.

The component units derived from the dicarboxylic acid may further contain a component unit derived from any dicarboxylic acid other than the above, if necessary. Examples of the other dicarboxylic acids include alicyclic dicarboxylic acids such as 1,4-cyclohexanedicarboxylic acid and cyclopentanedicarboxylic acid, and aliphatic dicarboxylic acids such as adipic acid, succinic acid, oxalic acid, and sebacic acid.

(Component Unit Derived from Diol)

Any component unit derived from a diol may be used, but from the viewpoint of enhancing the affinity with a fabric containing a polyester fiber, the component units preferably contain a component unit derived from an aliphatic diol.

The aliphatic diol preferably has 1 to 10 carbon atoms, more preferably 1 to 4 carbon atoms. Examples of the aliphatic diol include alkylene diols such as ethylene glycol, trimethylene glycol, 1,4-butanediol, pentamethylene glycol, hexamethylene glycol, neopentyl glycol, and decamethylene glycol. The aliphatic diol is preferably ethylene glycol.

The aliphatic diol may further have an anionic group as described above. Examples of the aliphatic diol having an anionic group include N,N-bis(2-hydroxyethyl)-2-aminoethanesulfonic acid (CAS number: 10191-18-1), dimethylolpropionic acid, and dimethylol.

The component units derived from the aliphatic diol may be 5 to 100 mol %, preferably 10 to 100 mol %, based on the total number of moles of the component units derived from the diol.

The component units derived from the diol may further contain a component unit derived from any diol other than the above, if necessary. Examples of the other diols include aromatic diols such as xylylene glycol and alicyclic diols such as cyclohexanedimethanol.

The polyester constituting the hydrophobic block may be of the same type as the polyester fiber contained in the fabric, or may be of a different type.

(Hydrophobic Block Constituting Polyester)

The weight average molecular weight of the hydrophobic block (or polyester) may be any value, but is preferably 500 to 10,000. A hydrophobic block with the weight average molecular weight of 500 or more is more likely to exhibit the characteristics of the hydrophobic block, thereby facilitating suitable binding to a fabric containing a hydrophobic fiber such as a polyester fiber. A hydrophobic block with the weight average molecular weight of 10,000 or less is less likely to impair the texture of the image-formed product. From the same viewpoint, the weight average molecular weight of the hydrophobic block is more preferably 500 to 5,000.

The weight average molecular weight of hydrophobic blocks can be measured in terms of polystyrene by gel permeation chromatography.

A weight average molecular weight can be measured by arranging three columns (Shodex™ GPC KF-806L (exclusion limit molecular weight: 2×10', separation range: 100 to 2×10', theoretical stage number: 10000 stages/piece, filler material: styrene-divinylbenzene copolymer, filler particle size: 10 μm)) in series in high performance liquid chromatography ("Waters 2695 (main body)" and "Waters 2414 (detector)" from Nihon Waters K.K.).

The content of the hydrophobic blocks in the block copolymer is preferably higher than the content of the hydrophilic blocks in the block copolymer. Specifically, the content of the hydrophobic blocks is preferably 60 to 95 mass % based on the total content of the hydrophobic blocks and the hydrophilic blocks. Hydrophobic blocks whose content is 60 mass % or more are more likely to enhance the binding property of the block copolymer to a fabric containing a hydrophobic fiber such as a polyester fiber, and hydrophobic blocks whose content is 95 mass % or less prevent the hydrophilic block content from becoming too small, so that the binding property to a fabric containing a hydrophilic fiber such as cotton is less likely to be impaired. From the same viewpoint, the content of the hydrophobic block is more preferably 70 to 90 mass % based on the total content of the hydrophobic blocks and the hydrophilic blocks.

[Hydrophilic Block]

The hydrophilic block is derived from a hydrophilic resin having an SP value of 11 or more.

The hydrophilic resin having an SP value of 11 or more may be any hydrophilic resin that has an SP value of 11 or more and ΔSP satisfying the above range, but the SP value of the hydrophilic resin is preferably ±2.0 or less, more preferably ±1.0 or less, and even more preferably ±0.5 or less relative to the SP value of the hydrophilic fiber constituting a fabric to be used. When the hydrophilic fiber constituting the fabric is a cellulose fiber having an SP value of 15.7, the SP value of the hydrophilic resin constituting the hydrophilic blocks is preferably 13.7 to 17.7, more preferably 14.7 to 16.7, and even more preferably 15.2 to 16.2.

Examples of the hydrophilic resin having an SP value of 11 or more include polyalkylene oxide, polyvinyl alcohol, polyamide, polyacrylonitrile, and polyvinylpyrrolidone. The hydrophilic resin is preferably polyalkylene oxide.

Any polyalkylene oxide may be used, but poly(C2-6 alkylene oxide) is preferred. Examples of the polyalkylene oxide include poly(ethylene oxide), poly(propylene oxide), poly(trimethylene oxide), poly(tetramethylene oxide), poly(hexamethylene oxide), copolymers of ethylene oxide and propylene oxide, ethylene oxide adducts of poly(propylene oxide), and copolymers of ethylene oxide and tetrahydrofuran. In particular, polyethylene oxide is preferred from the viewpoint of having a high affinity with a fabric containing a hydrophilic fiber such as cotton for facilitating suitable binding.

The weight average molecular weight of the hydrophilic blocks (or the hydrophilic resin) may be any value, but is preferably 500 to 6,000. Hydrophilic blocks with the weight average molecular weight of 500 or more is more likely to exhibits the characteristics of the hydrophilic block, thereby facilitating suitable binding to a fabric containing a hydrophilic fiber such as cotton. Hydrophilic blocks with the weight average molecular weight of 6,000 or less are less likely to impair the texture of the image-formed product. From the same viewpoint, the weight average molecular weight of the hydrophilic blocks is more preferably 500 to 5,000. The weight average molecular weight of the hydrophilic blocks can be measured by the same method as described above.

The content of the hydrophilic blocks is preferably 5 to 40 mass % based on the total content of the hydrophobic blocks and the hydrophilic blocks. Hydrophilic blocks whose content is 5 mass % or more are more likely to enhance the binding property to a fabric containing a hydrophilic fiber such as cotton, and hydrophilic blocks whose content is 40 mass % or less prevent the hydrophobic block content from becoming too small, so that the binding property to a fabric containing a hydrophobic fiber such as a polyester fiber is less likely to be impaired. From the same viewpoint, the content of the hydrophilic blocks is more preferably 10 to 30 mass % based on the total content of the hydrophobic blocks and the hydrophilic blocks.

[Block Copolymer]

The specific block copolymer includes the above described hydrophobic blocks and hydrophilic blocks, but preferably does not include a urethane bond. Resins with urethane bonds tend to lose their fixability to fabrics from light degradation.

The weight average molecular weight of the specific block copolymer may be any value, but is preferably 1,000 to 30,000. A block copolymer with the weight average molecular weight of 1,000 or more is more likely to enhance the binding property to a fabric, and a block copolymer with the weight average molecular weight of 30,000 or less reduces the noticeable stiffness of the fabric and is less likely to impair the texture of the image-formed product. From the same viewpoint, the weight average molecular weight of the specific block copolymer is more preferably 2,000 to 25,000.

The glass transition temperature Tg or melting point Tm of the specific block copolymer may be any value, but is preferably 25 to 70° C., more preferably 30 to 50° C. A specific block copolymer with the Tg above a predetermined value is more likely to prevent the resin from falling off during washing, and a specific block copolymer with the Tg below a predetermined value is less likely to impair the texture of the image-formed product.

The glass transition temperature Tg or melting point Tm of a block copolymer can be identified by reading the Tg or Tm from the endothermic peak obtained by raising the temperature in the temperature range of −30 to 100° C. at a temperature-raising rate of 10° C./min with the use of a differential scanning calorimetry device (DSC).

The block copolymer preferably has an anionic group as described above. Specifically, it is preferable that at least one of the hydrophobic block and the hydrophilic block, preferably both, has an anionic group.

The content of the anionic group may be any value, but is preferably set in a range such that the decrease in fixability to a fabric and the washing fastness due to the water solubility of the block copolymer becoming too high can be prevented.

The content of the specific block copolymer may be any value, but is preferably 2 to 40 mass % with respect to a pretreatment liquid. A block copolymer whose content is 2 mass % or more can maintain sufficient ink fixability, for example, even after washing (i.e., excellent in washing fastness), and a block copolymer whose content is 40 mass % or less is less likely to increase the amount of adhesion of the block copolymer to the fabric, and thus is less likely to impair the texture of the fabric. From the same viewpoint, the content of the specific block copolymer is more preferably 5 to 20 mass % with respect to the pretreatment liquid.

1-2. Additional Components

The pretreatment liquid may additionally contain components other than the above described components, if necessary. Examples of the additional components include solvents, preservatives, and pH adjusters.

(Solvent)

Any solvent may be used, but the solvent preferably contains a water-soluble organic solvent from the viewpoint of, for example, moisturizing property and viscosity adjustment. In particular, for applying the pretreatment liquid to a fabric by an inkjet method, the pretreatment liquid preferably further contains a water-soluble organic solvent.

Examples of the water-soluble organic solvent include alcohols, such as methanol, ethanol, propanol, pentanol, hexanol, cyclohexanol, and benzyl alcohol; polyhydric alcohols, such as ethylene glycol, diethylene glycol, triethylene glycol, polyethylene glycol, propylene glycol, dipropylene glycol, tripropylene glycol, and polypropylene glycol; polyhydric alcohol ethers, such as ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monobutyl ether, diethylene glycol dimethyl ether, propylene glycol monomethyl ether, and propylene glycol monoethyl ether; amines, such as ethanolamine, N-ethyldiethanolamine, morpholine, N-ethylmorpholine, ethylenediamine, diethylenediamine, and triethylenetetramine; amides, such as formamide, N,N-dimethylformamide, and N,N-dimethylacetamide; heterocycles, such as 2-pyrrolidone, N-methyl-2-pyrrolidone, N-cyclohexyl-2-pyrrolidone, 2-oxazoridone, and 1,3-dimethyl-2-imidazolidine; sulfoxides, such as dimethyl sulfoxide; and sulfones, such as sulfolane.

The content of the water-soluble organic solvent may be 20 to 50 mass % based on the total solvent (total of water and solvent) contained in the pretreatment liquid.

(Preservative)

Examples of the preservative include aromatic halogen compounds (such as Preventol CMK), methylene diisocyanate, halogen-containing nitrogen-sulfur compounds, and 1,2-benzisothiazolin-3-one (such as PROXEL GXL).

(pH Adjuster)

Examples of the pH adjuster include citric acid, sodium citrate, hydrochloric acid, and sodium hydroxide.

From the viewpoint of not impairing the texture of a fabric material, it is preferable that the pretreatment liquid is substantially free of a binder resin, such as a water-soluble resin or a water-dispersible resin (resin particles). The term "substantially free" means the content is, for example, less than 5 mass %, preferably 0 mass % with respect to the pretreatment liquid.

1-3. Physical Properties

The viscosity of the pretreatment liquid at 25° C. may also be appropriately adjusted according to the method of applying the pretreatment liquid to a fabric. For example, when the pretreatment liquid is applied by an inkjet method, the viscosity of the pretreatment liquid is preferably 4 to 20 mPa·s. The viscosity of the pretreatment liquid can be measured by an E-type viscometer at 25° C.

2. Method for Producing Pretreated Fabric and Pretreated Fabric

[Method for Producing Pretreated Fabric]

A pretreated fabric can be obtained through a step of applying the pretreatment liquid of the present invention to at least a part of the surface of a fabric to obtain the pretreated fabric.

The fiber material constituting the fabric may be any fiber, and may be a natural fiber such as cotton (cellulose fiber), linen, wool, or silk, or a chemical fiber such as rayon, vinylon, nylon, acryl, polyurethane, polyester, or acetate. The fabric may be in any form of these fibers, such as a woven fabric, a non-woven fabric, or a knitted fabric. The fabric may be a blended woven fabric or blended non-woven fabric of two or more types of fibers. In particular, the fabric preferably contains at least one of cotton and a polyester fiber.

(Application of Pretreatment Liquid)

The pretreatment liquid may be applied to the entire surface of a fabric, or may be selectively applied only to the area to be subjected to the application of the ink. The pretreatment liquid may be applied at any amount which can be adjusted according to the content of the block copolymer in the pretreatment liquid, the amount of an ink to be applied, and the like. For example, the application amount of the pretreatment liquid is set in such a way that the amount of adhesion of the block copolymer to the fabric is set to preferably 0.1 to 20 g/m$^2$, more preferably 0.5 to 10 g/m$^2$ per untreated fabric.

The method of applying the pretreatment liquid may be any method, such as a spray method, a coater method, an inkjet method, and a gravure method. For example, the inkjet method is preferred from the viewpoint of continuously performing with an ink application step in the image forming method described below, and the coater method is preferred from the viewpoint of applying a predetermined amount of the pretreatment liquid in a short time.

(Drying of Pretreatment Liquid) The pretreatment liquid applied to the fabric is then dried.

The drying method may be any method, such as heating by hot air, a hot plate, or a heat roller. Heat drying is preferred from the viewpoint of sufficiently removing the solvent component in a short time. The drying temperature may be 100 to 130° C.

[Pretreated Fabric]

The obtained pretreated fabric contains, at least on the surface thereof, the above described block copolymer.

The block copolymer thus can be bound to fabrics containing hydrophilic fibers via hydrophilic blocks and to fabrics containing hydrophobic fibers via hydrophobic blocks. If one of the hydrophilic block and the hydrophobic block is not bound to the fabric, the block is bonded to the other block, so that it is less likely to fall off when friction is applied to the surface of the fabric. A pretreated fabric containing such a block copolymer has high washing fastness and can reduce ink bleeding.

3 Image Forming Method and Image-Formed Product

[Image Forming Method]

The image forming method of the present invention includes steps of 1) preparing the pretreated fabric of the present invention and 2) applying an ink to the surface of the pretreated fabric by an inkjet method. For image formation, for example, a below described ink set containing the pretreatment liquid of the present invention and an ink may be used.

Step 1)

A pretreated fabric is prepared. The pretreated fabric may be obtained by applying a pretreatment liquid to a fabric by the above described producing method, or a pretreated fabric prepared in another line (separate step) in advance may be used.

Step 2)

An ink is then applied by an inkjet method to the treated surface (surface subjected to the pretreatment) of the obtained pretreated fabric. Specifically, the ink is ejected from an inkjet recording head to apply ink droplets.

As will be described below, the ink is a water-based ink containing a coloring material such as a pigment and water. The configuration of the ink will be described below.

The ink applied to the pretreated fabric is then dried and fixed to form a coloring material layer.

The drying and fixing are preferably performed by heating. That is, the drying method may be any method, such as a method using a heater, a hot air dryer, or a heat roller. In particular, it is preferable to heat and dry both sides of the fabric by using a hot air dryer and a heater.

The drying temperature may be any value, but is preferably 110° C. or higher, more preferably 130 to 180° C., from the viewpoint of sufficiently removing solvent components such as water contained in the applied ink. The drying time, which depends on the drying temperature, may be, for example, about 0.5 to 10 minutes.

[Image-Formed Product]

An image-formed product obtained by the image forming method of the present invention includes a pretreated fabric and a coloring material layer.

The coloring material layer is disposed on the pretreated fabric via a specific block copolymer applied to the pretreated fabric, and is suitably bound.

The composition of the coloring material layer is the same as the composition of the solid content of the ink described below.

4. Ink Set

The ink set of the present invention contains the pretreatment liquid of the present invention and an ink.

The ink contains a coloring material and water.

4-1. Coloring Material

The coloring material may be any material, for example, a dye or a dispersible coloring material such as a pigment. In particular, a dispersible coloring material is preferred, and a pigment is more preferred, from the viewpoint that the effect of improving the fixability by virtue of the pretreatment liquid of the present invention can be easily obtained, an image having excellent weather resistance can be easily formed, and the like.

The pigment may be any one of, for example, organic pigments and inorganic pigments having the following numbers listed in the Color Index.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, and Pigment Orange 13, 16, 20, and 36.

Examples of blue or cyan pigments include Pigment Blue 1, 15, 15:1, 15:2, 15:3, 15:4, 15:6, 16, 17-1, 22, 27, 28, 29, 36, and 60.

Examples of green pigments include Pigment Green 7, 26, 36, and 50. Examples of yellow pigments include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193.

Examples of black pigments include Pigment Black 7, 26, and 28.

Examples of commercially available products of such pigments include Chromofine Yellow 2080, 5900, 5930, AF-1300, and 2700L, Chromofine Orange 3700L and 6730, Chromofine Scarlet 6750, Chromofine Magenta 6880, 6886, 6891N, 6790, and 6887, Chromofine Violet RE, Chromofine Red 6820 and 6830, Chromofine Blue HS-3, 5187, 5108, 5197, 5085N, SR-5020, 5026, 5050, 4920, 4927, 4937, 4824, 4933GN-EP, 4940, 4973, 5205, 5208, 5214, 5221, and 5000P, Chromofine Green 2GN, 2GO, 2G-550D, 5310, 5370, and 6830, Chromofine Black A-1103, Seikafast Yellow 10GH, A-3, 2035, 2054, 2200, 2270, 2300, 2400(B), 2500, 2600, ZAY-260, 2700(B), and 2770, Seikafast Red 8040, C405(F), CA120, LR-116, 1531B, 8060R, 1547, ZAW-262, 1537B, GY, 4R-4016, 3820, 3891, and ZA-215, Seikafast Carmine 6B1476T-7, 1483LT, 3840, and 3870, Seikafast Bordeaux 10B-430, Seikalight Rose R40, Seikalight Violet B800, 7805, Seikafast Maroon 460N, Seikafast Orange 900 and 2900, Seikalight Blue C718, A612, and Cyanine Blue 4933M, 4933GN-EP, 4940, and 4973 (from Dainichiseika Color & Chemicals Mfg. Co., Ltd.);

KET Yellow 401, 402, 403, 404, 405, 406, 416, and 424, KET Orange 501, KET Red 301, 302, 303, 304, 305, 306, 307, 308, 309, 310, 336, 337, 338, and 346, KET Blue 101, 102, 103, 104, 105, 106, 111, 118, and 124, and KET Green 201 (from DIC Corporation);

Colortex Yellow 301, 314, 315, 316, P-624, 314, U10GN, U3GN, UNN, UA-414, and U263, Finecol Yellow T-13 and T-05, Pigment Yellow 1705, Colortex Orange 202, Colortex Red 101, 103, 115, 116, D3B, P-625, 102, H-1024, 105C, UFN, UCN, UBN, U3BN, URN, UGN, UG276, U456, U457, 105C, and USN, Colortex Maroon 601, Colortex Brown B610N, Colortex Violet 600, Pigment Red 122, Colortex Blue 516, 517, 518, 519, A818, P-908, and 510, Colortex Green 402 and 403, and Colortex Black 702 and U905 (from Sanyo Color Works, LTD.);

Lionol Yellow 1405G, Lionol Blue FG7330, FG7350, FG7400G, FG7405G, ES, and ESP-S (from Toyo Ink Co., Ltd.), and Toner Magenta E02, Permanent Rubin F6B, Toner Yellow HG, Permanent Yellow GG-02, and Hostapeam Blue B2G (from Hoechst Industry Limited.);

Novoperm P-HG, Hostaperm Pink E, and Hostaperm Blue B2G (from Clariant); and

Carbon Black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, and CF9 (from Mitsubishi Chemical Corporation).

The pigment may be a self-dispersing pigment. The self-dispersing pigment is obtained by modifying the surface of pigment particles with groups having hydrophilic groups so that the self-dispersing pigment has pigment particles and groups having hydrophilicity bonded to the surface thereof.

Examples of the hydrophilic groups include carboxyl groups, sulfonic acid groups, and phosphorus-containing groups. Examples of the phosphorus-containing groups include phosphate groups, phosphonic acid groups, phosphinic acid groups, phosphite groups, and phosphate groups. In particular, from the viewpoint of high affinity with the metal salt of the acid contained in the pretreatment liquid, a phosphorus-containing group is preferred, and a phosphate group or a phosphonic acid group is more preferred.

The groups having a phosphorus-containing group may be, for example, the same as those described in paragraphs [0026] to [0035] of Japanese Patent Application Laid-Open No. 2012-51357. For example, examples of the groups having a phosphonic acid group (as a hydrophilic group) include geminal bisphosphonic acid groups and vicinal bisphosphonic acid groups, specifically include groups having —$CQ(PO_3H_2)_2$, groups having —X—$(CH_2)$n-$CQ(PO_3H_2)_2$, groups having —X—$(CH_2)$n-$CQ(PO_3H_2)_2$, groups having —X-Sp-$(CH_2)$n-$CQ(PO_3H_2)_2$, groups having —N—$[(CH_2)$m$(PO_3H_2)]_2$, groups having —CR=C$(PO_3H_2)_2$, and groups having —X—$[CQ(PO_3H_2)_2]_p$.

In the above formulas,

Q is H, R, OR, SR or $NR_2$ (R is H, a C1-C6 alkyl group or aryl group), preferably H, OH or $NH_2$;

N is 0 to 9, preferably 0 to 3, more preferably 0 or 1;

X is an arylene group, a heteroarylene group, an alkylene group, a vinylidene group, an alkarylene group, an aralkylene group, a cyclic or heterocyclic group, preferably an arylene group such as phenylene group, naphthalene group or biphenylene group;

Sp is a linking group such as —$CO_2$—, —$O_2C$—, —CO—, —$OSO_2$—, —$SO_3$—, —$SO_2$—, —$SO_2C_2H_4O$—, —$SO_2C_2H_4S$—, —$SO_2C_2H_4NR$—, —O—, —S—, —NR—, —NRCO—, —CONR—, —$NRCO_2$—, —$O_2CNR$—, —NRCONR—, —N(COR″)CO—, —CON(COR)—, —NRCOCH($CH_2CO_2R''$)—, an arylene group or an alkylene group (R is H, a C1-C6 alkyl group or aryl group); and P is 1 to 4, preferably 2.

Examples of the group having a phosphate group (as a hydrophilic group) include groups obtained by replacing a phosphoric acid group with a phosphate group in the groups listed as having a phosphoric acid group.

Examples of commercially available self-dispersing pigments include Cab-0-Jet™ 200 K, 250C, 260M, 270V (sulfonic acid group-containing self-dispersing pigment), Cab-0-Jet™ 300K (carboxylic acid group-containing self-dispersing pigment), Cab-0-Jet™ 400K, 450C, 465M, 470V, 480V (phosphate group-containing self-dispersing pigment) from Cabot Corporation.

The content of the pigment may be any value, preferably 1.5 to 15 mass % with respect to the ink from the viewpoint that the viscosity of the ink can be easily adjusted within the above range and a high-density image can be formed. A pigment whose content is 1.5 mass % or more is more likely to form a high-density image, and a pigment whose content is 15 mass % or less prevents the viscosity of the ink from becoming too high, and thus is less likely to impair the injection stability. From the same viewpoint, the content of the pigment is more preferably 5 to 15 mass % with respect to the ink.

4-2. Additional Components

The ink may additionally contain other components, if necessary. Examples of the additional components include solvents, pigment dispersants, preservatives, and pH adjusters.

(Solvent)

Any solvent may be used, but the solvent is preferably a water-soluble organic solvent. As the water-soluble organic solvent, the same water-soluble organic solvent as that used for the pretreatment liquid can be used. In particular, from the viewpoint of facilitating the permeation of the ink in the pretreated fabric and the viewpoint of allowing the injection stability to be less likely to be impaired in an inkjet method, it is preferable that the ink does not thicken due to drying. The ink thus preferably contains a high boiling point solvent having a boiling point of 200° C. or higher.

The high boiling point solvent having a boiling point of 200° C. or higher may be any water-soluble organic solvent having a boiling point of 200° C. or higher, and is preferably polyols or polyalkylene oxides.

Examples of the polyols having a boiling point of 200° C. or higher include dihydric alcohols such as 1,3-butanediol (boiling point 208° C.), 1,6-hexanediol (boiling point 223° C.), and polypropylene glycol; and trihydric or higher alcohols such as glycerin (boiling point 290° C.), trimethylolpropane (boiling point 295° C.).

Examples of the polyalkylene oxides having a boiling point of 200° C. or higher include diethylene glycol monoethyl ether (boiling point 202° C.), triethylene glycol monomethyl ether (boiling point 245° C.), tetraethylene glycol monomethyl ether (boiling point 305° C.), tripropylene glycol monoethyl ether (boiling point 256° C.); and ethers of divalent alcohols such as polypropylene glycol and ethers of trihydric or higher alcohols such as glycerin (boiling point 290° C.) and hexanetriol.

(Pigment Dispersant)

When the pigment is not a self-dispersing pigment, the ink preferably further contains a pigment dispersant from the viewpoint of facilitating the dispersion of the pigment.

The pigment dispersant is preferably a polymer dispersant from the viewpoint of excellent dispersibility of the pigment. The polymer dispersant may be of any type, and may be any of a cationic dispersant, an anionic dispersant, and a nonionic dispersant. In particular, when the block copolymer contained in a pretreated fabric has an anionic group, a cationic dispersant or a nonionic dispersant is preferred.

The cationic dispersant may be a compound or polymer having a cationic group (secondary amino group (imino group), tertiary amino group or quaternary ammonium group). Examples of the cationic dispersant include tetraalkyl quaternary ammonium salts such as dodecyltrimethylammonium chloride, hexadecyltrimethylammonium chloride, and dihexadecyldimethylammonium bromide, and (meth)acrylate (co)polymers having amine salts, trialkyl quaternary ammonium salts, alkylpyridinium salts, alkylquinolinium salts, and cationic groups.

The anionic dispersant is a polymeric dispersant having a hydrophilic group selected from the group consisting of a carboxylic acid group, a phosphorus-containing group and a sulfonic acid group.

Examples of the polymeric dispersants having a carboxylic acid group include polycarboxylic acids and salts thereof. Examples of polycarboxylic acids include (co)polymers of a monomer selected from acrylic acid or derivatives thereof, maleic acid or derivatives thereof, itaconic acid or derivatives thereof, and fumaric acid or derivatives thereof, and salts of the (co)polymers. Examples of other monomers constituting the copolymer include styrene and vinylnaphthalene.

The polymeric dispersant having a phosphorus-containing group is a polymeric dispersant having a phosphate group or a phosphonic acid group. Examples of the polymeric dispersant having a phosphate or phosphonic acid group include alkyl phosphate esters or salts thereof.

Examples of the polymeric dispersant having a sulfonic acid group include formalin condensates of aromatic sulfonic acids and formalin condensates of lignin sulfonic acids, and a formalin condensate of an aromatic sulfonic acid is preferred. Examples of the formalin condensates of aromatic sulfonic acids include condensed sodium naphthalene sulfonate.

The acid value of the anionic dispersant may be any value, but is preferably a moderately high value, for example, 10 to 300 mgKOH/g or less, preferably 10 to 150 mgKOH/g or less, from the viewpoint of enhancing the affinity with the metal salt of the acid attached to a pretreated fabric. The acid value of the anionic dispersant can be measured by the acid value measurement of JIS K 0070.

Examples of the nonionic dispersant include polyoxyalkylenes and polyoxyalkylene alkyl ethers.

The content of the pigment dispersant is preferably 20 to 60 mass % with respect to the pigment. A pigment dispersant whose content is 20 mass % or more is likely to sufficiently increase the dispersibility of a solid colorant such as a pigment, and a pigment dispersant whose content is 60 mass % or less is more likely to prevent an excessive increase in viscosity. From the same viewpoint, the content of the pigment dispersant is preferably 20 to 40 mass % with respect to the pigment.

(Preservative and pH Adjuster)

As the preservative and pH adjuster, the same preservative and pH adjuster that may be used in the pretreatment liquid can be used.

An ink containing a pigment dispersant or a self-dispersing pigment is more likely to achieve suitable fixability. The ink of the present invention thus can be substantially free of a binder resin (for example, with a molecular weight exceeding 10,000) such as a water-soluble resin or resin particles as in conventional inks. The term "substantially free" means the content is, for example, 2 mass % or less based on the total solid content of the ink. As a result, it is possible to obtain an image-formed product having suitable fixability to a fabric without making the fabric stiff and impairing the texture of the material of the fabric.

4-3. Physical Properties

The viscosity of the ink at 25° C. may be any value such that the ejection property by the inkjet method becomes suitable, but is preferably 3 to 20 mPa·s, and more preferably 4 to 12 mPa·s. The viscosity of the ink can be measured by an E-type viscometer at 25° C.

EXAMPLES

Hereinafter, the present invention will be specifically described with reference to Examples, but the present invention is not limited thereto.

1. Preparation of Pretreatment Liquid

<Preparation of Material>

(Resin)

(Preparation of Block Copolymer 1)

Added were 97 g of dimethyl terephthalate, 20 g of ethylene glycol, 0.2 g of anhydrous sodium acetate, and 0.1 g of titanium catalyst (Sakai Chemical Industry Co., LTD., SPC-124), and after replacement with an inert gas, transesterification was performed at a temperature of 165 to 220° C. while methanol was distilled off at normal pressure.

Next, added were 36 g of methyl polyethylene glycol 750, 46 g of methyl polyethylene glycol 1820, and 193 g of polyethylene glycol 1500, and after replacement with an inert gas, a condensation reaction was performed at a temperature of 160 to 240° C. and excess glycol components were distilled off. Then, the resultant was cooled to obtain a solution containing a polyethylene terephthalate (PET)/polyethylene oxide (PEO) block copolymer (block copolymer 1). The physical properties of the obtained block copolymer were as follows.

Tg (or Tm): 25° C.
Mw: 6,200
Hydrophobic block (PET), SP value: 10.7 and Mw: 1,100
Hydrophilic block (PEO), SP value: 15.0 and Mw: 1,500
Hydrophilic block content: 70 mass %
Anionic group: No (Preparation of Block Copolymer 2)

A polyethylene terephthalate (PET)/polyethylene oxide (PEO) block copolymer (block copolymer 2) was obtained in the same manner as block copolymer 1 except that the amount of the titanium catalyst (Sakai Chemical Industry Co., LTD., SPC-124) was 0.02 g. The physical properties of the obtained block copolymer were as follows.

Tg (or Tm): 5° C.
Mw: 2,500
Hydrophobic block (PET), SP value: 10.7 and Mw: 700
Hydrophilic block (PEO), SP value: 15.0 and Mw: 1,500
Hydrophilic block content: 70 mass %
Anionic group: No (Preparation of Block Copolymer 3)

Added were 145 g of dimethyl terephthalate, 40 g of dimethyl sodium 5-sulfoisophthalate, 40 g of ethylene glycol, 0.2 g of anhydrous sodium acetate, and 0.01 g of titanium catalyst (Sakai Chemical Industry Co., LTD. SPC-124), and after replacement with an inert gas, transesterification was performed at a temperature of 165 to 220° C. while methanol was distilled off at normal pressure.

Next, added were 21 g of methyl polyethylene glycol 750, 26 g of methyl polyethylene glycol 1820, and 110 g of polyethylene glycol 1500, and after replacement with an inert gas, a condensation reaction was performed at a temperature of 160 to 240° C. and excess glycol components were distilled off. Then, the resultant was cooled to obtain a polyethylene terephthalate (PET)/polyethylene oxide (PEO) block copolymer (block copolymer 3) as a solid content. The physical properties of the obtained block copolymer were as follows.

Tg (or Tm): 35° C.
Mw: 9,500
Hydrophobic block (PET), SP value: 10.7 and Mw: 1,500
Hydrophilic block (PEO), SP value: 15.0 and Mw: 1,500
Hydrophilic block content: 40 mass %
Anionic group: Yes (Preparation of Block Copolymer 4)

A polyethylene terephthalate (PET)/polyethylene oxide (PEO) block copolymer (block copolymer 4) was obtained in the same manner as block copolymer 3 except that the amount of the titanium catalyst (Sakai Chemical Industry Co., LTD., SPC-124) was 0.1 g. The physical properties of the obtained block copolymer were as follows.

Tg (or Tm): 40° C.
Mw: 20,000
Hydrophobic block (PET), SP value: 10.7 and Mw: 2,300
Hydrophilic block (PEO), SP value: 15.0 and Mw: 1,500
Hydrophilic block content: 40 mass %
Anionic group: No (Preparation of Block Copolymer 5)

A polyethylene terephthalate (PET)/polyethylene oxide (PEO) block copolymer (block copolymer 5) was obtained in the same manner as block copolymer 1 except that the charging ratio of the hydrophobic block (PET) and the hydrophilic block (PEO) was changed so that the content of the hydrophilic block (PEO) becomes 40 mass %. The physical properties of the obtained block copolymer were as follows.

Tg (or Tm): 32° C.
Mw: 6,200
Hydrophobic block (PET), SP value: 10.7 and Mw: 1,100
Hydrophilic block (PEO), SP value: 15.0 and Mw: 1,500
Hydrophilic block content: 40 mass %
Anionic group: No (Preparation of Block Copolymer 6)

A polyethylene terephthalate (PET)/polyethylene oxide (PEO) block copolymer (block copolymer 6) was obtained in the same manner as in block copolymer 3 except that dimethyl sodium 5-sulfoisophthalate was not used.

The physical properties of the obtained block copolymer were as follows.

Tg (or Tm): 35° C.
Mw: 9,500
Hydrophobic block (PET), SP value: 10.7 and Mw: 1,500
Hydrophilic block (PEO), SP value: 15.0 and Mw: 1,500
Hydrophilic block content: 40 mass %
Anionic group: No (Preparation of Block Copolymer 7)

A polyethylene terephthalate (PET)/polypropylene oxide (PPO) block copolymer (block copolymer 7) was obtained in the same manner as block copolymer 1 except that PPG1000 (FUJIFILM Wako Pure Chemical Corporation) was used in place of PEG. The physical properties of the obtained block copolymer were as follows.

Tg (or Tm): 27° C.
Mw: 6,500
Hydrophobic block (PET), SP value: 10.7 and Mw: 1,100
Hydrophilic block (PPO), SP value: 15.0 and Mw: 1,000
Hydrophilic block content: 70 mass %
Anionic group: No Vylonal MD2000 (from TOYOBO Colo., LTD.): Polyester resin emulsion (Tg: 67° C., number average molecular weight: 18×10$^3$, resin concentration 40 mass %)

Superflex 300 (from DKS Co. Ltd.): Polyurethane resin emulsion (Tg: −42° C., resin concentration: 30 mass %)

PEG2000 (from Kanto Chemical Co., Inc.): Polyethylene glycol

The Tg (or Tm) and weight average molecular weight of resins, and the SP value and the weight average molecular weight of blocks were measured by the following methods.

(Tg or Tm)

The glass transition temperature Tg of a resin separated from the obtained resin dispersion was read by using a DSC (from METTLER TOLEDO) from the endothermic peak obtained by raising the temperature in the temperature range of −30 to 100° C. at a temperature-raising rate of 10° C./min.

(Weight Average Molecular Weight)

The weight average molecular weight of a resin can be measured by arranging three columns (Shodex™ GPC KF-806L (exclusion limit molecular weight: 2×10$^7$, separation range: 100 to 2×10$^7$, theoretical stage number: 10000 stages/piece, filler material: styrene-divinylbenzene copolymer, filler particle size: 10 μm)) in series in high performance liquid chromatography ("Waters 2695 (main body)" and "Waters 2414 (detector)" from Nihon Waters K.K.).

(SP Value)

The SP value of blocks was obtained by the above method using the molecular attractive force constant.

(Solvent)

Ethylene glycol (boiling point 197.6° C.)
Glycerin (boiling point 290° C.)

(Additional Components)

Preservative: Proxel GXL (1,2-benzisothiazolin-3-one)
pH adjuster: Sodium citrate hydrate <Preparation of Pretreatment Liquids A to K and M to O>

The resins, solvents and additional components shown in Table 1 were mixed so as to have the compositions shown in Table 1 to obtain pretreatment liquids A to K and M to O.

<Preparation of Pretreatment Liquid L>

Pretreatment liquid L was obtained in the same manner as in pretreatment liquid A except that MD2000 as polyester and PEG200 (from Kanto Chemical Co., Inc.) as polyoxyethylene in place of a block copolymer were mixed at a mass ratio of 6:4 for use.

Table 1 shows the compositions of obtained pretreatment liquids A to G, and Table 2 shows the compositions of obtained pretreatment liquids H to O.

TABLE 1

| | Type | Mw | Tg (° C.) | Hydrophobic/ Hydrophilic (mass ratio) | Anionic group | Resin Concentration (mass %) | Unit | PL* A | PL B | PL C | PL D | PL E | PL F | PL G |
|---|---|---|---|---|---|---|---|---|---|---|---|---|---|---|
| Resin (Polymer | Block Copolymer 1 | 6,200 | 25 | 30/70 | NO | 60 | Parts by mass | 3.3 | 16.7 | | | | | |

TABLE 1-continued

|  | Type | Mw | Tg (° C.) | Hydrophobic/ Hydrophilic (mass ratio) | Anionic group | Resin Concentration (mass %) | Unit — | PL* A | PL B | PL C | PL D | PL E | PL F | PL G |
|---|---|---|---|---|---|---|---|---|---|---|---|---|---|---|
|  | Block Copolymer 2 | 2,500 | 5 | 30/70 | NO | 70 |  |  | 2.9 | 14.3 | 57.1 |  |  |  |
|  | Block Copolymer 3 | 9,500 | 35 | 60/40 | YES | 30 |  |  |  |  |  |  | 33.3 |  |
|  | Block Copolymer 4 | 20,000 | 40 | 60/40 | NO | 25 |  |  |  |  |  |  |  | 40.0 |
|  | Block Copolymer 5 | 6,200 | 32 | 60/40 | NO | 30 |  |  |  |  |  |  |  |  |
|  | Block Copolymer 6 | 9,500 | 35 | 60/40 | NO | 30 |  |  |  |  |  |  |  |  |
|  | Block Copolymer 7 | 6,500 | 27 | 30/70 | NO | 50 |  |  |  |  |  |  |  |  |
|  | MD2000 (Polyester) | 18,000 | 67 | — | — | 40 |  |  |  |  |  |  |  |  |
|  | Superflex 300 | — | −42 | — | — | 30 |  |  |  |  |  |  |  |  |
|  | PEG2000 | 2,000 | 51-55 | — | — | 100 |  |  |  |  |  |  |  |  |
| Solvent | Glycerin |  |  |  |  |  |  | 10.0 | 5.0 | 10.0 | 5.0 | 5.0 | 5.0 | 5.0 |
|  | Ethylene Glycol |  |  |  |  |  |  | 25.0 | 25.0 | 25.0 | 25.0 | — | 25.0 | 25.0 |
| Others | Preservative |  |  |  |  |  |  | 0.1 | 0.1 | 0.1 | 0.1 | 0.1 | 0.1 | 0.1 |
|  | Ion-exchanged water |  |  |  |  |  |  | 61.6 | 53.2 | 62.0 | 55.6 | 37.8 | 36.6 | 29.9 |
|  | Total |  |  |  |  |  |  | 100 | 100 | 100 | 100 | 100 | 100 | 100 |
|  | Resin Concentration |  |  |  |  |  | mass % | 2.0 | 10.0 | 2.0 | 10.0 | 40.0 | 10.0 | 10.0 |
|  | Viscosity (25° C.) |  |  |  |  |  | mPa·s | 4.5 | 6.0 | 5.0 | 6.5 | 11.0 | 7.0 | 7.0 |

*PL: Pretreatment Liquid

TABLE 2

|  | Type | Mw | Tg (° C.) | Hydrophobic/ Hydrophilic (mass ratio) | Anionic group | Resin Concentration (mass %) | Unit — | PL* H | PL I | PL J | PL K | PL L | PL M | PL N | PL O |
|---|---|---|---|---|---|---|---|---|---|---|---|---|---|---|---|
| Resin (Polymer) | Block Copolymer 1 | 6,200 | 25 | 30/70 | NO | 60 | Parts by mass |  |  |  |  | 1.7 |  |  |  |
|  | Block Copolymer 2 | 2,500 | 5 | 30/70 | NO | 70 |  |  |  |  |  |  |  |  |  |
|  | Block Copolymer 3 | 9,500 | 35 | 60/40 | YES | 30 |  |  |  |  |  |  |  |  |  |
|  | Block Copolymer 4 | 20,000 | 40 | 60/40 | NO | 25 |  |  |  |  |  |  |  |  |  |
|  | Block Copolymer 5 | 6,200 | 32 | 60/40 | NO | 30 |  |  |  |  |  |  | 33.3 |  |  |
|  | Block Copolymer 6 | 9,500 | 35 | 60/40 | NO | 30 |  |  |  |  |  |  |  | 33.3 |  |
|  | Block Copolymer 7 | 6,500 | 27 | 30/70 | NO | 50 |  |  |  |  |  |  |  |  | 20 |
|  | MD2000 (Polyester) | 18,000 | 67 | — | — | 40 |  | 25.0 |  |  |  | 15.0 |  |  |  |
|  | Superflex 300 | — | −42 | — | — | 30 |  |  | 33.3 |  |  |  |  |  |  |
|  | PEG2000 | 2000 | 51-55 | — | — | 100 |  |  |  | 10.0 |  | 4.0 |  |  |  |
| Solvent | Glycerin |  |  |  |  |  |  | 5.0 | 5.0 | 5.0 | 10.0 | 5.0 | 5.0 | 5.0 | 5.0 |
|  | Ethylene Glycol |  |  |  |  |  |  | 25.0 | 25.0 | 25.0 | 25.0 | 25.0 | 25.0 | 25.0 | 25.0 |
| Others | Preservative |  |  |  |  |  |  | 0.1 | 0.1 | 0.1 | 0.1 | 0.1 | 0.1 | 0.1 | 0.1 |
|  | Ion-exchanged water |  |  |  |  |  |  | 44.9 | 36.6 | 59.9 | 63.2 | 50.9 | 36.6 | 36.6 | 49.9 |
|  | Total |  |  |  |  |  |  | 100 | 100 | 100 | 100 | 100 | 100 | 100 | 100 |
|  | Resin Concentration |  |  |  |  |  | mass % | 10.0 | 10.0 | 10.0 | 1.0 | 10.0 | 10.0 | 10.0 | 10.0 |
|  | Viscosity (25° C.) |  |  |  |  |  | mPa·s | 6.5 | 6.5 | 6.5 | 4.0 | 6.5 | 6.5 | 6.5 | 6.5 |

*PL: Pretreatment Liquid

2. Preparation of Ink
<Preparation of Ink>

An ink was obtained by mixing 10 mass % of cationic carbon black dispersion with a pigment concentration of 30 mass % (carbon black dispersed with a quaternary ammonium salt dispersant, and the dispersant content is 30 mass % relative to the pigment), 10 mass % of glycerin, 25 mass % of ethylene glycol, and appropriate amounts of a preservative (Proxel GXL) and a pH adjuster (sodium citrate hydrate), and adding an adjusted amount of ion-exchanged water in such a way that the total mass becomes 100 mass %.

3. Image Formation and Evaluation
<Tests 1 to 24>
(1) Pretreatment

The following fabrics were prepared.
Fabric 1: 100% cotton fabric
Fabric 2: 100% polyester fabric
Fabric 3: Nylon 6

A pretreatment liquid with the type shown in Table 3 was applied to the surface of a fabric as shown in Table 3 by an inkjet method in such a way that the applied amount of the pretreatment liquid was 30 g/m². A highly viscous pretreatment liquid was applied by a spray method. The fabric was then dried at 110° C. for 2 minutes, thereby obtaining a pretreated fabric.

(2) Application of Ink, Drying and Fixing

As an image forming apparatus, an inkjet printer including an inkjet head (printhead KM1024iMAE from Konica Minolta, Inc.) was prepared. Then, an ink prepared above was ejected from the nozzle of the above inkjet head to form a solid image on a pretreated fabric. Specifically, an image including a fine line grid, a gradation, and a solid portion (200 mm×200 mm in total) was formed by a main scan of 540 dpi×a sub scan of 720 dpi. The "dpi" represents the number of ink droplets (dots) per 2.54 cm. The ejection frequency was 22.4 kHz.

The fabric with the ink applied thereon was dried at 150° C. for 3 minutes in a belt-conveying dryer, thereby obtaining an image-formed product.

<Evaluation>

The image-formed products obtained in Tests 1 to 24 were evaluated for washing fastness, bleeding and texture by the following methods.

(Washing Fastness)

The washing fastness of an image-formed product was evaluated for discoloration by comparing an image-formed product after washing once in a household washing machine (rinsing with water) with the image-formed product before the washing. Evaluation was made based on the following evaluation criteria.

Excellent: No discoloration after rinsing with water
Good: Slight or substantially no discoloration after rinsing with water and excellent in practical use
Fair: Discoloration after rinsing with water at a level posing no problem in practical use
Poor: Substantial discoloration after rinsing with water at a level posing a problem in practical use When the evaluation was "Fair" or better, the washing fastness was evaluated as in an allowable range.

(Bleeding)

The bleeding of an image-formed product was evaluated by visually observing the formed image of the fine line grid part. Evaluation was made based on the following evaluation criteria.

Good: No bleeding
Fair: Slight bleeding at a level posing no problem in practical use
Poor: Bleeding at a level posing a problem in practical use When the evaluation was "Fair" or better, the bleeding was evaluated as in an allowable range.

(Texture)

The texture of an obtained image-formed product and fabric was evaluated sensorily by touching the object with fingers. Evaluation was made based on the following evaluation criteria.

Good: Original softness of the fabric was maintained, which was substantially the same as before image formation
Fair: A little harder than before image formation, but the texture of the fabric is unimpaired at a level posing no problem in practical use
Poor: Harder than before image formation, and the texture of the fabric is impaired at a level posing a problem in practical use When the evaluation was "Fair" or better, the texture was evaluated as in an allowable range.

Table 3 shows the evaluation results of Tests 1 to 24.

TABLE 3

| Test No. | Pre treatment Liquid | Fabric | Bleeding | Washing Fastness | Texture | Remark |
| --- | --- | --- | --- | --- | --- | --- |
| 1 | A | 1 | Good | Fair | Good | Present Invention |
| 2 | B | 1 | Good | Fair | Fair | Present Invention |
| 3 | C | 1 | Good | Fair | Good | Present Invention |
| 4 | D | 1 | Good | Fair | Good | Present Invention |
| 5 | E | 1 | Good | Good | Good | Present Invention |
| 6 | F | 1 | Good | Excellent | Fair | Present Invention |
| 7 | G | 1 | Fair | Good | Fair | Present Invention |
| 8 | B | 2 | Good | Good | Fair | Present Invention |
| 9 | C | 2 | Fair | Fair | Good | Present Invention |
| 10 | D | 2 | Fair | Fair | Good | Present Invention |
| 11 | E | 2 | Good | Good | Good | Present Invention |
| 12 | F | 2 | Good | Excellent | Fair | Present Invention |
| 13 | G | 2 | Fair | Good | Fair | Present Invention |
| 14 | K | 1 | Fair | Fair | Good | Present Invention |
| 15 | M | 1 | Good | Good | Fair | Present Invention |
| 16 | N | 1 | Good | Good | Fair | Present Invention |
| 17 | O | 1 | Good | Fair | Fair | Present Invention |
| 18 | B | 3 | Good | Fair | Fair | Present Invention |
| 19 | H | 1 | Poor | Poor | Poor | Comparative Example |
| 20 | I | 1 | Fair | Poor | Fair | Comparative Example |
| 21 | J | 2 | Poor | Poor | Poor | Comparative Example |
| 22 | L (Blended) | 2 | Poor | Poor | Poor | Comparative Example |
| 23 | NO | 1 | Poor | Poor | Poor | Comparative Example |

TABLE 3-continued

| Test No. | Pre treatment Liquid | Fabric | Bleeding | Washing Fastness | Texture | Remark |
|---|---|---|---|---|---|---|
| 24 | NO | 2 | Poor | Poor | Poor | Comparative Example |

As shown in Table 3, all the image-formed products (in the present invention) of Tests 1 to 18 using a pretreatment liquid containing a predetermined block copolymer have excellent ink fixability, so that suitable washing fastness, less bleeding, and a suitable texture were achieved.

All of the image-formed products (in the comparative examples) of Tests 19 to 24 using a pretreatment liquid not containing a predetermined block copolymer have low ink fixability, so that at least the washing fastness is low.

The present invention can provide a pretreatment liquid capable of giving high ink fixability for various fabrics having different polarities, obtaining suitable washing fastness, and forming an image with reduced ink bleeding.

Although embodiments of the present invention have been described and illustrated in detail, it is clearly understood that the same is by way of illustration and example only and not limitation, the scope of the present invention should be interpreted by terms of the appended claims

What is claimed is:

1. A pretreatment liquid for a fabric to be used for inkjet textile printing, the pretreatment liquid comprising:
   a block copolymer including a hydrophobic block derived from a hydrophobic resin having an SP value of less than 11 and a hydrophilic block derived from a hydrophilic resin having an SP value of 11 or more, wherein a difference between the SP values of the hydrophobic resin and the hydrophilic resin is 1.0 or more, and the hydrophilic block has no anionic group; and
   water.

2. The pretreatment liquid according to claim 1, wherein: the hydrophobic resin is polyester.

3. The pretreatment liquid according to claim 1, wherein: in the block copolymer, a content of the hydrophobic block is higher than a content of the hydrophilic block.

4. The pretreatment liquid according to claim 3, wherein: the content of the hydrophobic block is 60 to 95 mass % based on a total content of the hydrophobic block and the hydrophilic block.

5. The pretreatment liquid according to claim 1, wherein:
   a weight average molecular weight of the hydrophobic block is 500 to 10,000; and
   a weight average molecular weight of the hydrophilic block is 500 to 6,000.

6. The pretreatment liquid according to claim 1, wherein:
   a weight average molecular weight of the block copolymer is 1,000 to 30,000.

7. The pretreatment liquid according to claim 1, wherein:
   a glass transition temperature or a melting point of the block copolymer is 25 to 70° C.

8. The pretreatment liquid according to claim 1, wherein: the hydrophobic block has an anionic group.

9. The pretreatment liquid according to claim 1, wherein: the hydrophilic resin is polyalkylene oxide.

10. The pretreatment liquid according to claim 1, wherein: the block copolymer does not include a urethane bond.

11. The pretreatment liquid according to claim 1, wherein:
    a content of the block copolymer is 2 to 40 mass % with respect to the pretreatment liquid.

12. A pretreated fabric to be subjected to an application of an inkjet textile printing ink, the pretreated fabric being obtained by pretreating at least a part of a surface of a fabric, the pretreated fabric comprising:
    a block copolymer including a hydrophobic block derived from a hydrophobic resin having an SP value of less than 11 and a hydrophilic block derived from a hydrophilic resin having an SP value of 11 or more, wherein a difference between the SP values of the hydrophobic resin and the hydrophilic resin is 1.0 or more, and the hydrophilic block has no anionic group.

13. The pretreated fabric according to claim 12, wherein: the hydrophobic resin is polyester.

14. The pretreated fabric according to claim 12, wherein: the fabric contains at least one of cotton and a polyester fiber.

15. An ink set, comprising:
    the pretreatment liquid according to claim 1, and an ink containing a coloring material.

16. The pretreatment liquid according to claim 1, wherein the pretreatment liquid consists of the block copolymer, the water, optionally a water-soluble organic solvent, and optionally a preservative.

* * * * *